United States Patent [19]
Arney

[11] 3,982,788
[45] Sept. 28, 1976

[54] TIRE CHAIN APPLICATOR

[76] Inventor: Donald Brian Arney, 12287 Fulton St., Maple Ridge, British Columbia, Canada, V2X 6L4

[22] Filed: Mar. 13, 1975

[21] Appl. No.: 558,311

[52] U.S. Cl. .............................. 301/44 T; 152/216; 152/218
[51] Int. Cl.² ......................................... B60B 15/00
[58] Field of Search ............ 152/208, 213 R, 213 A, 152/214, 216, 217, 218, 221, 222, 223; 301/38 R, 41 R, 42, 44 T, 43, 44 R

[56] References Cited
UNITED STATES PATENTS

| | | | |
|---|---|---|---|
| 2,239,730 | 4/1941 | Moore | 152/213 R |
| 2,527,939 | 10/1950 | Krider | 152/213 R |
| 2,900,002 | 8/1959 | Ecker | 152/216 |
| 3,078,902 | 2/1963 | Scheidlinger | 152/213 R |

Primary Examiner—Stanley H. Tollberg
Assistant Examiner—Frederick R. Handren
Attorney, Agent, or Firm—Carver and Company

[57] ABSTRACT

Applicator for applying transverse traction sections to an automobile tire having a toothed cog mounted on the outer surface of the hub at each of the openings between the hub and rim, which are connected in driving engagement with a manually operated worm-gear drive unit, the lead of the worm being such as to lock the cog against rotation of its own accord. A perforated steel ribbon slidably extends out of one end of a sheath secured diametrically across the wheel hub, and passes over and in meshing engagement with the cog and extends through a channel secured to the rim at the opening. The steel ribbon is so arranged so that when the cog is operated to extend the steel ribbon out of the sheath, the lead end of the ribbon will curl around the tire from the inside to the outside so as to enable one end of a traction section to be secured thereto and then drawn over the tire by retracting the ribbon into the sheath. The other end of the traction section is then secured to a hook disposed on the outer side of the rim.

3 Claims, 6 Drawing Figures

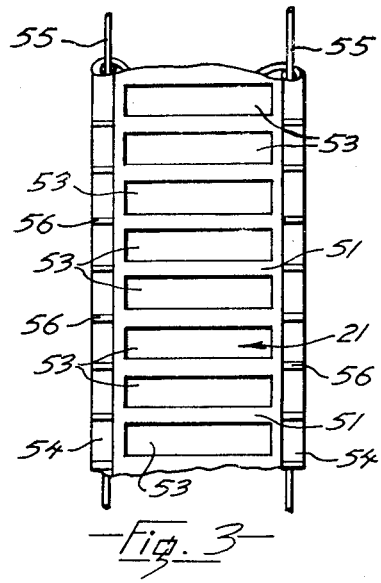
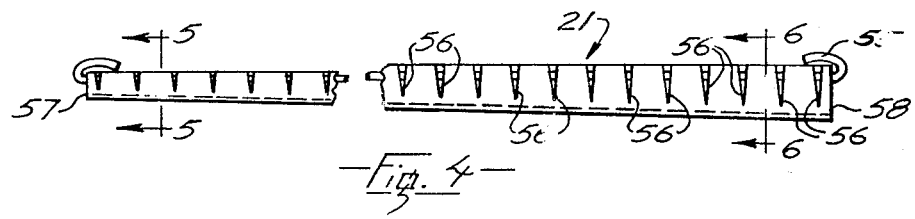
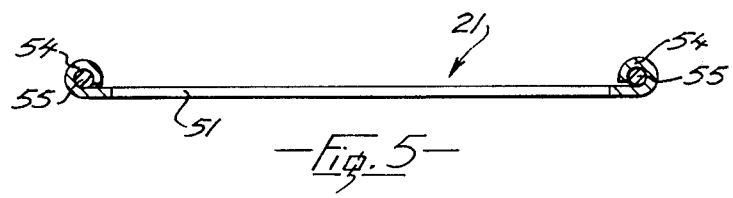
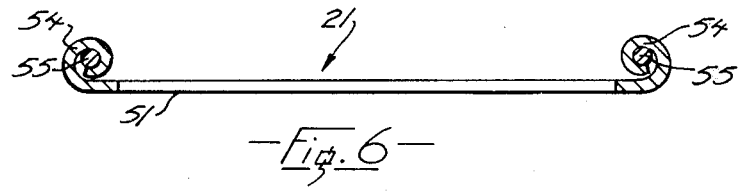

TIRE CHAIN APPLICATOR

BACKGROUND OF THE INVENTION

1. Field of the Invention

This invention relates to traction chains for automobile tires and in particular an applicator therefore.

2. Prior Art

Automobile tire chains, conventionally, have a plurality of transverse traction sections which are connected at their ends to a pair of parallel side straps, the chain being wrapped around the automobile tire with one of the side straps on the inside of the tire and the other on the outside of the tire and the ends of the side straps then being connected.

Tire chains of this nature are exceedingly difficult to apply particularly when the automobile is standing in snow or mud. The difficulties arise in connecting the inside straps, as most automobile drivers are aware, and many types of devices have been devised to make this connection without the driver having to crawl under the automobile to do so.

In some tire chains the side straps have been dispensed with, as their only purpose is to connect the transverse sections, and the transverse sections applied directly across the tire tread and secured by means of straps passing through the wheel. This type of tire chain is also difficult to apply in modern cars as the wheel and tire are partially hidden by the fender.

SUMMARY OF THE INVENTION

The present invention provides a chain of the last mentioned type and an applicator therefore to secure transverse traction sections to the automobile tire which can be operated at the outside of the wheel and avoids the difficulties.

The applicator of the invention has a toothed cog secured on the outer surface of the wheel hub adjacent an opening between the hub and rim, manually operated means for rotating the cog in either direction, a perforated steel ribbon trained over and in meshing engagement with the cog and passing through the opening, and being adapted when the cog-wheel is rotated to extend in a curl around the tire from the inside to the outside thereof, the ribbon having means at its free end to enable one end of the traction section to be secured thereto so that when the cog is operated in reverse, said one end of each traction section is drawn around the tire to the inner side of the wheel and means to secure the other end of the traction section to the outside of the wheel.

A detailed description following, related to drawings, gives exemplification of apparatus according to the invention which, however, is capable of expression in means other than those particularly described and illustrated.

DESCRIPTION OF THE DRAWINGS

In the drawings which illustrate the invention,

FIG. 3 is a plan view of a portion of a steel ribbon, FIG. 4 is a side elevation of the steel ribbon, FIGS. 5 and 6 are sections of the ribbon taken on Lines 5—5 and 6—6 of FIG. 4.

DETAILED DESCRIPTION

Figure 1:
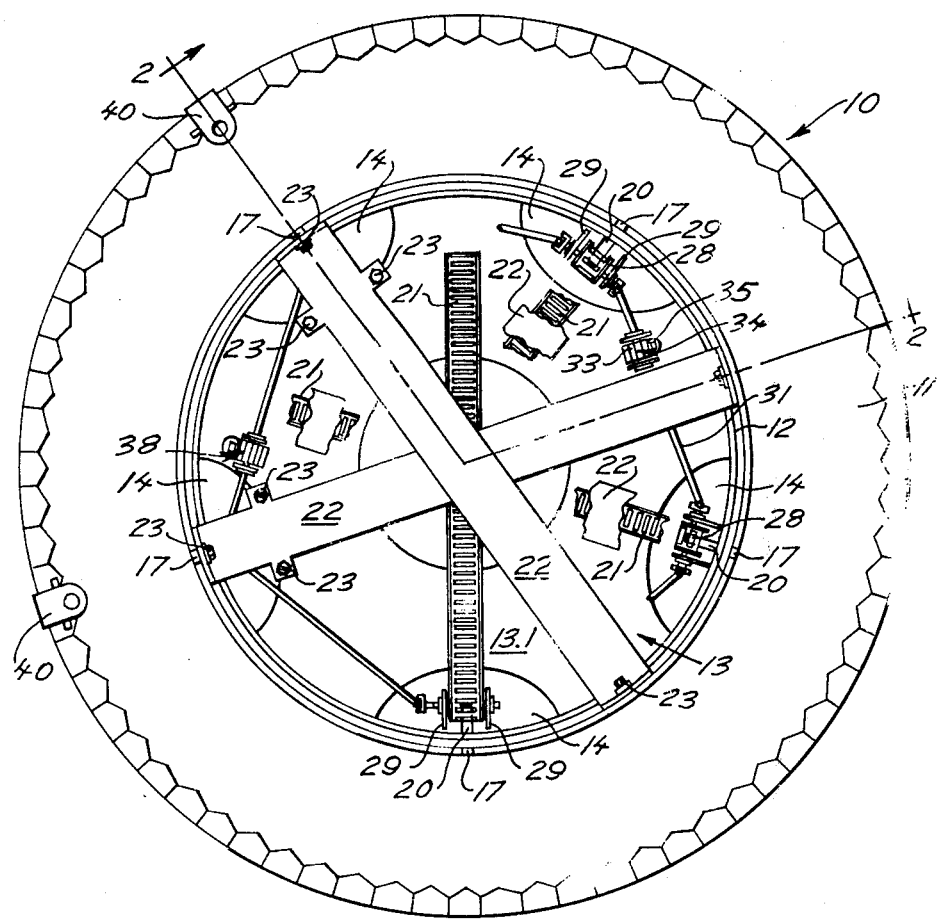
FIG. 1 is a side elevation of a tire and wheel with the applicator of the invention disposed thereon, portions of the applicator being removed for the clarity of illustration.
Figure 2:
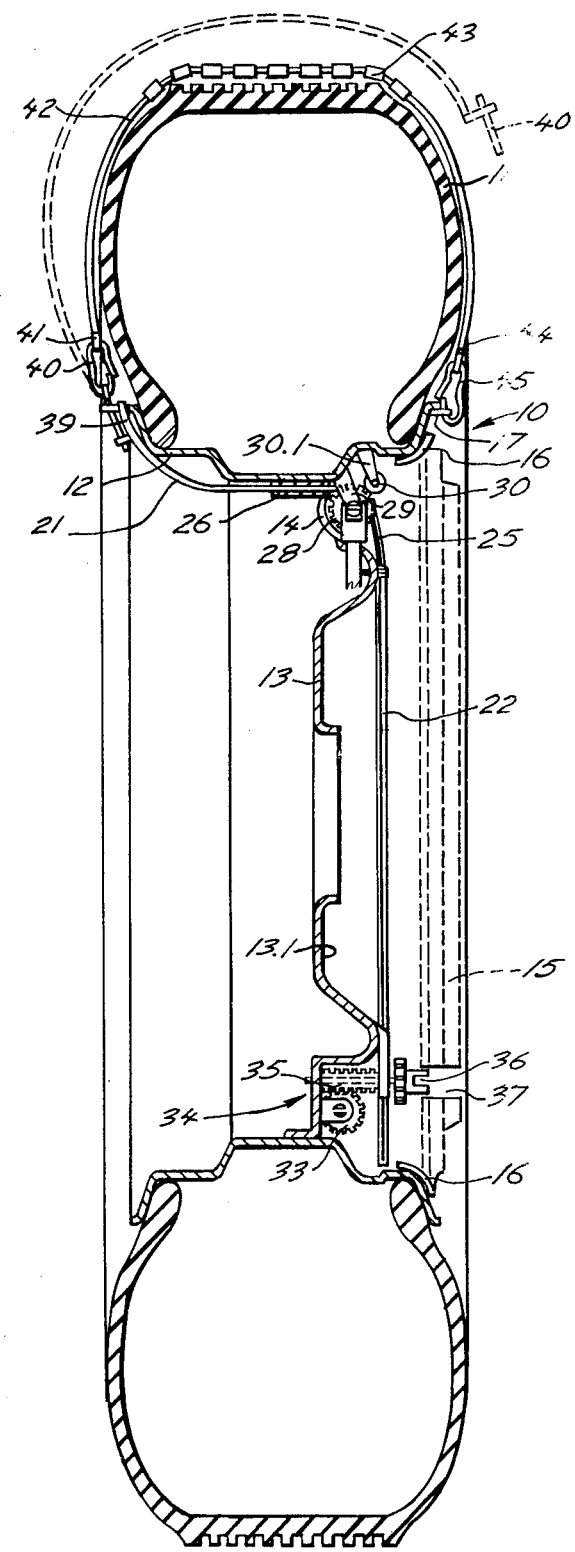
FIG. 2 is a section on Line 2—2 of FIG. 1.

Referring to the drawings, in particular to FIGS. 1 and 2, the numeral 10 designates, generally, an automobile wheel having a tire 11 mounted thereon. The wheel has a rim 12 and a hub 13 having an outer face 13.1. The hub, as is conventional, is provided with openings, severally 14, at the rim.

A hub cap 15, shown in broken outline, is secured to the rim by means of clips 16 and the rim is provided with a plurality of hooks, severally 17, arranged around the outer edge.

The applicator of the invention includes a plurality of diametrically disposed perforated ribbons, severally 21, which are formed of spring steel and which are encased for sliding movement in diametrically extending sheaths 22 which are secured by bolts 23 to the wheel. The ribbons extend out of open ends 25, see FIG. 2, of the sheaths and pass through channels 26 which are welded to the wheel rim and which extend transversely thereacross. The perforations of the steel ribbons mesh with teeth of associated cog wheels, severally 28, which are mounted in brackets 29 secured to the outer face of the hub between each channel 26 and its associated sheath 22. The ribbons are maintained in driven engagement with their associated cog wheels by means of rollers 30 which are mounted in brackets 30.1.

An uneven number of ribbons are used, e.g. five being shown in FIG. 1, with the cogs of three of them on one-half of the wheel being linked in driven engagement through the mediacy of universally interconnected drive shafts 31 driven by the gear 33 of a worm-gear drive unit 34 having a worm 35 which is provided with a socket 36 into which a driving tool, not shown, can be inserted through an opening 37 in the hub cap. The other two cogs on the other one-half of the wheel are similarly connected to worm-gear drive unit 38. The lead of the worm 35 is such that the units 34 and 38 cannot back drive, i.e. the cogs cannot drive the worm so that the cogs are effectively locked against movement of their own accord.

The outer end 39, see FIG. 2, of each of the ribbons has a clip 40 to which one end 41 of a transverse traction member 42 can be secured. The traction member is a cable type having the traction grips, severally 43, secured thereon. It will be appreciated that the traction member can also be a conventional link chain. The other end 44 of each of the traction members carries a hook 45.

Referring to FIGS. 3, 4, 5 and 6, each of the steel ribbons has a flat central section 51 provided with rectangular perforations, severally 53, to provide meshing engagement with the cogs. Marginal longitudinal edge portions 54—54 are rolled to form tubes, axes of which are spaced from the plane of the central portion through which flexible tension members 55—55 slidably pass. The tension members can be lengths of fine wire, such as piano wire, and secured such as by clenching to the ends of the tubes. Flexibility of the steel ribbon is obtained by making a plurality of cuts 56 transversely across the tubes, i.e. the tubes are in fact segmented, thus enabling the steel ribbon to flex in either direction. The length of the tension members are such that the ribbons lie flat in a state of repose. It will also be seen that tubes are disposed so that the tension members lie closer to the central portion 51 at the lead end 57, see FIG. 4, than they do at the tail end 58 of each of the ribbons.

The ribbons are disposed over the cogs with the tubes confronting the rim. Curvature of the ribbons in one direction around the cogs results in curvature in the opposite direction of the lead or free portion of the ribbons as they pass out of the channels so that when the ribbons are extended out of the sheaths, by operation of the cogs, they tend to curl across the tire as shown in broken outline in FIG. 2 so as to enable a traction section to be connected to the free end of each of them.

In use of the applicator, the wheel is positioned so that one group of steel ribbons associated with one of the worm-gear drive units is disposed clear of the ground. The associated worm-gear drive unit is operated by a tool so that ribbons of that group are all extended to the position as shown in broken outline in FIG. 2 and the transverse members secured to the ribbons and also secured to the hooks 17. The worm-gear unit is then operated to draw the ribbons back into their sheaths which thus draw the transverse members, secured to each of them, across the tire. The automobile is then moved so as to rotate the wheels to a position in which the other group of ribbons associated with the other worm unit is clear of the ground and the transverse members applied as above described.

The transverse members will not slacken as, due to the characteristics of a worm-gear unit, the gear cannot drive the worm. The transverse sections are, of course, removed by reversal of the operation described above.

I claim:

1. An applicator for applying flexible transverse traction members to an automobile tire mounted on a wheel assembly, the assembly having a hub and a rim, the hub having openings therethrough adjacent the rim, the applicator comprising:
   a. a cog having teeth mounted on the wheel assembly adjacent each opening therein,
   b. a manually operated worm-gear driving unit mounted on the wheel assembly in driving engagement with each cog for rotating the latter and being adapted to lock the cog against rotation,
   c. a plurality of steel ribbons, one for each opening, and each ribbon being in meshing engagement with the cog at each opening for movement through each opening,
   d. the ribbons being constructed so that when each is moved by its respective cog through the opening each curls radially outwardly around the side wall and across the tread of the tire,
   e. means for connecting one end of a transverse traction member to the outside of the rim at each opening,
   f. means for connecting an opposite end of each transverse traction member to an associated ribbon so as to enable the traction members to be drawn transversely across the tire tread when the steel ribbons are retracted by operation of the cog.

2. An applicator as claimed in claim 1 in which the steel ribbon comprises:
   a. a flat perforated body portion,
   b. segmented tubular side portions extending longitudinally of the body portion, said tubular side portions extending above said body portion,
   c. a flexible tension member slidably extending through each of said tubular side portions and secured at opposite ends to the ends of the tubular side portions, length of the tension member being such that the ribbon extends flat longitudinally in a state of repose.

3. An applicator as claimed in claim 1 including channels extending transversely across the rim through each opening for slidably accepting each ribbon and sheaths extending diametrically across the wheel on the outer side thereof for slidably accepting each ribbon.

* * * * *

UNITED STATES PATENT OFFICE
CERTIFICATE OF CORRECTION

Patent No. 3,982,788    Dated September 28, 1976

Inventor(s) Donald Brian Arney

It is certified that error appears in the above-identified patent and that said Letters Patent are hereby corrected as shown below:

On the cover sheet insert:

-- [30] Foreign Application Priority Data

Great Britain    12249    March 20, 1974 --.

Signed and Sealed this

Fourteenth Day of December 1976

[SEAL]

Attest:

RUTH C. MASON
*Attesting Officer*

C. MARSHALL DANN
*Commissioner of Patents and Trademarks*